United States Patent [19]

Schechter

[11] 4,327,695

[45] May 4, 1982

[54] UNIT FUEL INJECTOR ASSEMBLY WITH FEEDBACK CONTROL

[75] Inventor: Michael M. Schechter, Southfield, Mich.

[73] Assignee: Ford Motor Company, Dearborn, Mich.

[21] Appl. No.: 219,107

[22] Filed: Dec. 22, 1980

[51] Int. Cl.³ .............................................. F02M 59/30
[52] U.S. Cl. .................................. 123/504; 123/499; 123/500; 239/88
[58] Field of Search ............... 123/504, 500, 501, 499; 239/88, 585

[56] References Cited

U.S. PATENT DOCUMENTS

| 3,625,192 | 12/1971 | Dreisin | 123/495 |
|---|---|---|---|
| 3,796,206 | 3/1974 | Links | 123/499 |
| 3,835,829 | 9/1974 | Links | 123/458 |
| 3,837,324 | 9/1974 | Links | 123/458 |
| 3,921,604 | 11/1975 | Links | 123/499 |
| 3,990,413 | 11/1976 | Pischinger | 123/505 |
| 4,044,745 | 8/1977 | Brinkman et al. | 123/499 |
| 4,235,374 | 11/1980 | Walter et al. | 123/500 |
| 4,247,044 | 1/1981 | Smith | 239/585 |
| 4,295,453 | 10/1981 | Seilly et al. | 123/499 |

FOREIGN PATENT DOCUMENTS 2010963  7/1979  United Kingdom ............... 123/499

Primary Examiner—Charles J. Myhre
Assistant Examiner—Magdalen Moy
Attorney, Agent, or Firm—Robert E. McCollum; Clifford L. Sadler

[57] ABSTRACT

A unit fuel injector assembly consisting of a plunger type pump surrounded by a solenoid actuator, the voltage to which is controlled to vary the duration and magnitude of fuel pumped, thereby controlling the plunger stroke, a position feedback device providing a correction to the fuel flow to match actual flow with scheduled flow.

5 Claims, 3 Drawing Figures

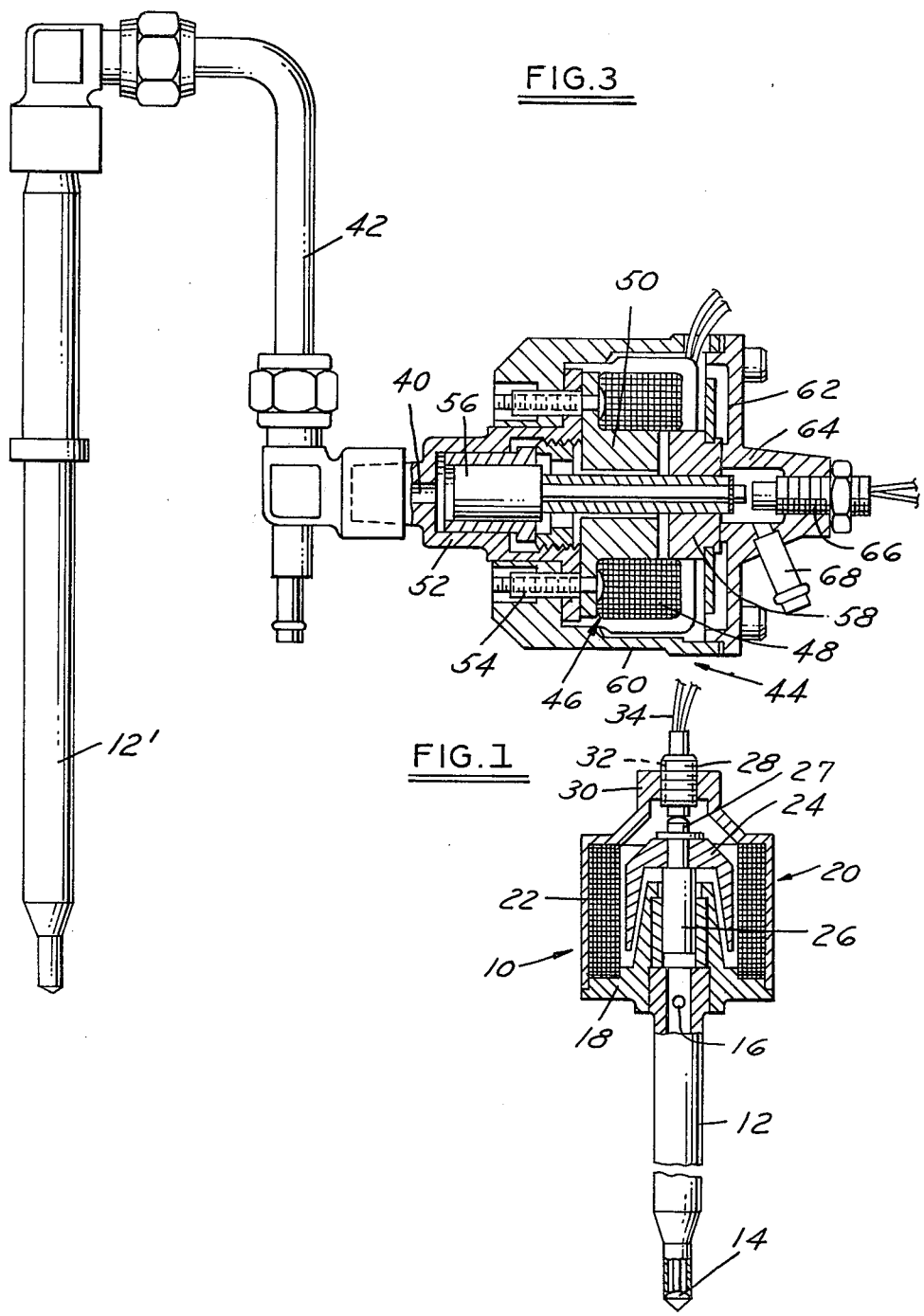

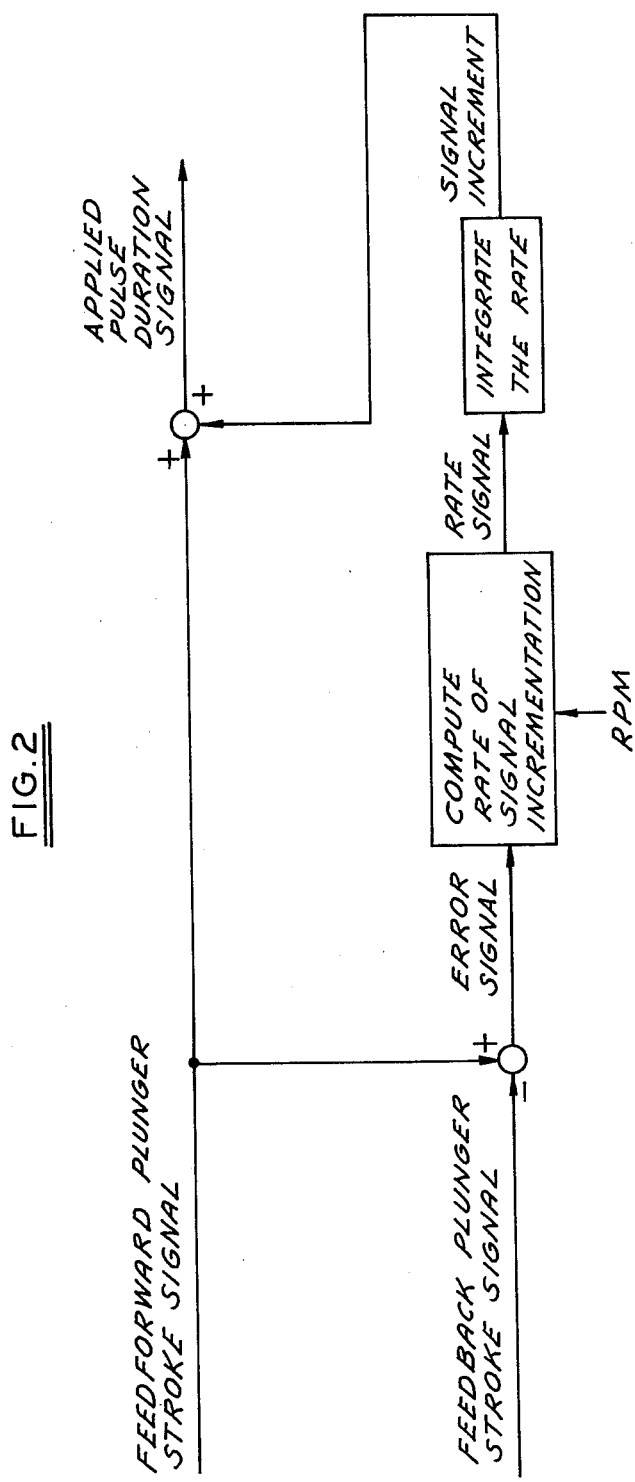

UNIT FUEL INJECTOR ASSEMBLY WITH FEEDBACK CONTROL

This invention relates in general to an automotive type fuel injection system and controls. In particular, it relates to a unit injector assembly that comprises a fuel injector, a plunger type fuel pump, a solenoid actuator, and a feedback type variable plunger stroke control for controlling the magnitude and duration of fuel injected. In one embodiment, the injector is integrated with the pump and solenoid assembly. In another embodiment, the injector is remotely located. The invention is an electromagnetic version of the mechanical pump stroke control shown and described in my copending U.S. patent application, Ser. No. 193,984, titled Fuel Injection and Control Systems, filed Oct. 6, 1980, and now U.S. Pat. No. 4,300,509.

Fuel injection systems of this general type are known in the prior art; however, they are not of the compact, simple, electrically controlled unit injector assembly type of this invention. For example, U.S. Pat. No. 3,990,413, Pischinger, shows a plunger type pumping assembly with a delivery valve and a stroke control for varying the plunger stroke; however, these elements are not integrated into a single unit, there is no electromagnetic means for actuating the plunger, nor is the duration and magnitude of the fuel injector controlled electrically.

U.S. Pat. No. 3,625,192 shows a fuel injection system in which fuel is pressurized behind a metering plunger 12 to determine the length of time the plunger remains open. No electrical control is provided.

U.S. Pat. No. 3,837,324, Links, shows an integrated fuel injection assembly having a pump and nozzle assembly integrated, and solenoid means for controlling a fuel valve. However, two solenoids and associated control mechanisms are required.

U.S. Pat. No. 4,044,745, Brinkman, shows an oscillating pump and an electromagnet, with stroke control means, but not constructed in the axially aligned, compact manner of this invention. The pump has an entirely different activating mechanism and the stroke control is not varied by controlling the pulses to the electromagnet.

It is another object of the invention, therefore, to provide a fuel injection control and system for an automotive type internal combustion engine that includes; a unit injector assembly that contains (a) a fuel injector, (b) a radial type pumping plunger operated by a solenoid with the electrical impulses to the solenoid being controlled by an electrical control unit whose voltage varies in accordance with a predetermined schedule, and (c) a correction device to change the voltage in accordance with signals from a position sensor associated with the pump plunger to vary the amplitude and duration of injection to assure conformance with the desired schedule.

Other objects, features, and advantages of the invention will become more apparent upon reference to the succeeding detailed description thereof, and to the drawings illustrating the preferred embodiments thereof; wherein:

FIG. 1 is a cross-sectional view of a unit fuel injector assembly embodying the invention;

FIG. 2 is a schematic block diagram representation of the control logic for the pump plunger stroke; and, FIG. 3 is a cross-sectional view of another embodiment of the invention.

FIG. 1 shows a unit fuel injector assembly 10. The lower part of the assembly constitutes the housing of a conventional fuel injector 12 having a fuel pressure actuated valve 14 that opens outwardly when the fuel pressure reaches a sufficient level. The details of construction of this particular injector are not given since they are known and believed to be unnecessary for an understanding of the invention. Suffice it to say that it could be constructed as fully shown and described in U.S. Pat. No. 3,542,293, Bishop et al, assigned to the assignee of this invention, with a tension spring unit for maintaining the valve closed below a predetermined fuel pressure.

Fuel injector 12 at its upper end contains a fuel inlet 16 that would be connected to a suitable low pressure fuel supply line, not shown. A check valve and a pressure regulator would be included in the line to permit entry of fuel into inlet 16 at a maintained pressure level, and to assure closure of the inlet upon actuation of the pump plunger unit to be described to prevent leakage of fuel out of the supply line.

The upper end of the housing of unit injector 10 is formed as the stationary core 18 of a solenoid assembly 20. It includes a coil 22 surrounding a reciprocable E-shaped armature element 24 that is secured to the upper end of a plunger 26 to constitute a fuel pumping unit. The plunger-armature 26 has a projection 27 adapted to engage an adjustable stop 28 that is threaded through a housing or cover 30 for coil 22. The stop 28 is hollow and contains a proximity sensor 32 connected by wiring 34 to an electrical control unit, not shown. This will be described in more detail later.

The pumping action in this case is caused and controlled by the magnetic force generated in the solenoid coil 22. The quantity of fuel displaced by plunger 26 is determined by the magnitude and duration of the current pulse in solenoid coil 22, while the timing of injection is defined by the timing of the pulse. There would be a separate plunger for each engine cylinder.

The unit is intended to be controlled by a data processing and computing device, such as a microprocessor, which would continuously monitor the main operating parameters of the engine, such as airflow, EGR flow, RPM, coolant and fuel temperatures, for example, compute the required fuel delivery and injection timing, and generate and send out to all solenoids current pulses of such magnitude and duration, and with such timing as needed to produce the required stroke of the plunger 26 at the required instant. In addition, the microprocessor would also monitor the actual stroke of the fuel pumping plunger serving the individual engine cylinders. Whenever the measurement of an actual plunger stroke indicated an excess or deficiency in the quantity of fuel injected into an individual cylinder, the correction device/portion of the microprocessor would modify the current pulse sent to the corresponding solenoid 20 until the required plunger stroke was achieved. Independent control of the fuel quantities injected into individual cylinders would assure the ability to maintain the required pattern of uniform cylinder-to-cylinder fuel distribution.

Since the stroke of plunger 26 is determined by both the magnitude of the magnetic force impulse and its duration, the same plunger stroke, therefore, can be achieved with a variety of impulses with different combinations of force and its duration, as long as the total energy of the impulses is the same. Thus, a substantial degree of freedom to tailor the rate of fuel injection as desired exists. For every engine speed and load combination, therefore, the microprocessor could select an impulse with offered the best compromise between the most desirable rate of injection in terms of fuel flow per millisecond and the desirable duration of injection expressed in crankshaft degrees.

In operation, fuel enters the injector inlet 16 through a suitable check valve, and when solenoid coil 22 is not energized, fuel pressure keeps the plunger 26 in its uppermost position pressed against the adjustable stop 28. Adjusting the stop will calibrate the air gap in the solenoid. Energizing the solenoid coil 22 drives the plunger downward, thus pressurizing the fuel trapped in the body of injector 12 until the injector valve opening pressure is reached and the valve 14 opens to allow fuel to be injected into the cylinder. When the solenoid coil 22 is deenergized, fuel pressure stops the downward movement of plunger 26 and the injection is terminated. Since the mass of plunger 26 is small in comparison with the magnitude of the pressure force, the deceleration of the plunger is very fast and results in a sharp cut-off of injection. For even faster injection cut-off, a plunger return spring may be incorporated in the design. Expansion of the compressed fuel (and return spring, if any) moves the plunger up until the pressure drops below the supply pressure and the inlet check valve opens, letting in the supply fuel. The cycle ends with the injector refilled with fuel and the plunger up against the adjustable stop 28, ready for the next injection stroke.

The interior of the coil 22 is vented through an opening not shown into an intake air duct leading to the engine air intake throttle. Therefore, any fuel leaking past the plunger 26 evaporates, and mixed with the intake air, will find its way into the cylinders. As a result, the fuel delivery into the cylinder is essentially independent of the leakage and equals the displaced volume less the compression volume.

No retraction valve is needed in this design since the small volume of fuel subjected to compression makes the fuel delivery insensitive to variations in the cylinder backpressure. It is estimated that if the injector volume is 600 mm$^3$, a 300 psi increase in pressure subtracts about 2.5 mm$^3$ from the volume of the fuel. Therefore, a 60 psi change in cylinder backpressure will change the fuel delivery only one-half of a cubic millimeter.

If all unit injectors to all the engine cylinders were identical in every respect, identical impulses would produce identical plunger strokes in all of them. In reality, however, due to inevitable minor differences in inertial masses, friction, solenoid coils, air gaps, etc., plunger strokes in different units may not be quite the same, thus leading to uneven cylinder-to-cylinder fuel distribution. To assure uniform fuel distribution, the impulses sent to different unit injectors are individually tailored to each of them to assure equal plunger strokes of required length in all of them. For this, the microprocessor must receive information on actual plunger stroke in each unit to correct for any discrepancies.

The signals of the plunger position proximity sensor 32 are fed into the microprocessor, not shown, and permit the latter to evaluate the actual plunger stroke, compare it with the required one, and modify, if necessary, the current impulse sent to solenoid coil 22, until the actual stroke matches the required one. FIG. 3 shows the logic diagram for the closed loop plunger stroke control system. The feedforward signal is generated by the microprocessor on the basis of information it receives from various engine sensors and is computed as a function of the airflow, RPM, coolant temperature, etc., for example, according to a predetermined schedule, stored in the microprocessor memory. This basic signal, which defines a certain pulse duration and is the same for all unit injectors in the engine, represents a demand for a specific plunger stroke. The feedback signal, which is supplied by the plunger position sensor 32, represents the actual plunger stroke during the last engine cycle. If the actual stroke equals the required one, the two signals are equal, and the error signal is zero. Whenever the plunger stroke differs from the required value, an error signal appears in the system, and the microprocessor begins to correct the stroke by incrementing the pulse duration so as to bring the error signal close to zero. The rate at which the pulse duration signal is incremented is a function of both the magnitude of the error signal and engine RPM.

Integration of the rate in terms of real time produces the pulse duration signal increment which is added to the basic feedforward signal, thus modifying the applied pulse duration signal. Modification of the applied signal continues until the required value of the plunger stroke is achieved. At that time, the error signal becomes zero, or close to it, the pulse duration signal increment becomes constant, and the system achieves stable condition. As a result, with a matched set of plunger position sensors in the engine, the microprocessor sends to each solenoid 20 current pulses of individually tailored duration which assure correct and equal plunger strokes in all unit injectors.

FIG. 3 illustrates a further embodiment of the invention. In this case, the injector 12' is not integrated with the pump in an end-to-end relationship, as shown in FIG. 1, but is remotely located and connected to the outlet 40 of the pump by suitable tubing 42. The pump unit assembly 44, however, is constructed in a manner similar to that shown in FIG. 1. It contains a solenoid coil assembly 46 that includes a coil 48 surrounding a stationary core element 50. The latter is adjustably fixed to a lower housing 52 by screws 54. The housing 52 defines the fuel outlet 40 for the plunger pump that includes a plunger 56 fixed to the movable armature 58 of the solenoid 46. The solenoid is enclosed by a second housing 60 and a cover 62. The latter has a raised boss 64 that constitutes a stop for the upward movement of armature 58. A proximity sensor 66 projects through cover 62 adjacent the armature. A vent line 68 is provided to collect fuel leakage past the plunger armature.

While the invention has been shown and described in its preferred embodiments, it will be clear to those skilled in the arts to which it pertains that many changes and modifications may be made thereto without departing from the scope of the invention.

I claim:

1. A feedback type fuel pumping and metering assembly consisting of a plunger type fuel pump, an electromagnetic actuator for the plunger pump, and plunger stroke control means all integrated into a single compact unit for controlling the amount and duration of injection of fuel from the pump, a fuel inlet connected to a source of supply fuel at a low pressure and having a check valve therein, a fuel outlet containing a pressure relief type valve, the inlet being adjacent one end of a plunger axially movable to one position through a fuel intake stroke by the fuel under pressure from the inlet acting thereagainst, the plunger being fixedly secured to and axially aligned with the armature of a solenoid surrounding the plunger for unitary movement whereby energization of the solenoid by electrical impulses thereto effects a movement of the plunger in the opposite direction through a fuel pumping stroke to increase the fuel pressure in the inlet to a level effecting closing of the check valve and an expulsion of the fuel into the outlet, an electrical control means connected to the solenoid providing a source of voltage to the solenoid that varies in accordance with a predetermined schedule of fuel flow and includes correction means to vary the voltage to the solenoid to adjust the plunger stroke and fuel injection to agree with the predetermined schedule, the stroke control means including adjustable means to vary the length of the intake stroke of the plunger and thereby the maximum volume of fuel inducted to thereby vary the amount of fuel ejected during movement of the plunger through its pumping stroke, the stroke control means also including armature position sensing means located adjacent the armature and operatively connected to the electrical control means providing a feedback control input signal to the correction means to enable the latter means to adjust the magnitude and duration of voltage to the solenoid to vary the magnitude and duration of fuel injection to conform the fuel flow to the predetermined schedule.

2. A feedback type fuel pumping and metering assembly consisting of a fuel injector, a plunger type fuel pump, an electromagnetic actuator for the plunger pump, and plunger stroke control means all integrated into a single compact unit for controlling the amount and duration of injection of fuel from the injector, the injector being of the spring closed fuel pressure opened type having a fuel inlet containing a one-way check valve and connected to a source of supply fuel at a low pressure, the inlet being below one end of a plunger axially movable to one position through a fuel intake stroke by the fuel under pressure from the inlet acting thereagainst, the plunger and armature of a solenoid surrounding the plunger being integrated for unitary movement, energization of the solenoid by electrical impulses thereto effecting a movement of the plunger in the opposite direction through a pumping stroke to increase the fuel pressure to a level effecting a closing of the check valve and an opening of the fuel injector and an expulsion of the fuel therefrom, an electrical control means connected to the solenoid providing a source of voltage to the solenoid that varies in accordance with a predetermined schedule of fuel flow and includes correction means to vary the voltage to the solenoid to adjust the plunger stroke and fuel injection to agree with the predetermined schedule, the stroke control means including mechanical stop means variably moveable into engagement with the plunger to vary the distance of travel of the plunger through its intake stroke to thereby vary the volume of fuel inducted to thereby vary the amount of fuel injected during each movement of the plunger through its pumping stroke, the stroke control means also including armature position sensing means located adjacent the armature and operatively connected to the electrical control means providing a feedback control input signal to the correction means to enable the latter means to adjust the magnitude and duration of voltage to the solenoid to vary the magnitude and duration of injection to conform the fuel flow to the predetermined schedule.

3. An assembly as in claim 1, including a fuel injector remotely positioned from the pump and connected to the outlet.

4. An assembly as in claim 2, the plunger and sensor being coaxially located on the longitudinal axis of the injector in an end-to-end relationship with the fuel injector to provide a compact unitary assembly.

5. An assembly as in claim 2, including a multi-pieced housing, a first housing portion extending longitudinally and containing the fuel injector, a second housing portion extending longitudinally from the first housing portion in an end-to-end relationship and containing the pump plunger axially aligned with the fuel injector and enclosed by the solenoid, a third housing portion contiguous to the second portion at the end thereof opposite the first portion and containing the movable stop means, the sensor being integrated with the stop means.

* * * * *